(12) United States Patent
Hsu

(10) Patent No.: US 7,946,705 B1
(45) Date of Patent: May 24, 2011

(54) RECHARGEABLE ILLUMINATED EYEGLASSES

(75) Inventor: Chan-Hsin Hsu, Tainan (TW)

(73) Assignee: Sun and Young Sunglasses Co., Ltd., Tainan (TW)

( * ) Notice: Subject to any disclaimer, the term of this patent is extended or adjusted under 35 U.S.C. 154(b) by 0 days.

(21) Appl. No.: 12/827,065

(22) Filed: Jun. 30, 2010

(51) Int. Cl.
*G02C 1/00* (2006.01)
(52) U.S. Cl. .................. 351/158; 362/103
(58) Field of Classification Search .......... 351/158, 351/41, 111, 51, 52; 362/103, 105, 106, 362/208, 800; 348/376
See application file for complete search history.

(56) References Cited

U.S. PATENT DOCUMENTS

| | | | |
|---|---|---|---|
| 6,554,444 B2 * | 4/2003 | Shimada et al. | 362/103 |
| 6,824,265 B1 * | 11/2004 | Harper | 351/158 |
| 7,607,775 B2 * | 10/2009 | Hermanson et al. | 351/158 |
| 2009/0190026 A1 * | 7/2009 | Chen | 348/376 |

* cited by examiner

*Primary Examiner* — Hung X Dang
(74) *Attorney, Agent, or Firm* — Rosenberg, Klein & Lee

(57) ABSTRACT

This invention relates to a rechargeable illuminated eyeglasses, in which two temple arms are respectively hinged on both sides of a frame and a rechargeable lighting apparatus is provided in the interior of at least one temple arm. A light emitting body is disposed in front end of the temple arm such that the direction of light beam emitted from the light emitting body is in conformity with user's view direction. The rechargeable lighting apparatus comprises a light emitting body, a control switch, a battery and an USB slot. Configuring like this, the battery is recharged with electricity through the USB slot so that undesired battery replacement step can be eliminated to achieve environment protection purpose of reuse of battery.

3 Claims, 3 Drawing Sheets

RECHARGEABLE ILLUMINATED EYEGLASSES

BACKGROUND OF THE INVENTION

1. Field of Invention

This invention relates to a rechargeable illuminated eyeglasses, more particularly to an illuminated eyeglasses for assisting people having presbyopia or assisting bad illumination in night time in which a repeatedly chargeable lighting apparatus for eyeglasses is assembled in a temple arm so as to achieve environment protection purpose of repeated-use of battery.

2. Brief Description of the Prior Art

Eyeglasses have functions of correcting vision abnormalities of various levels such as myopia, hyperopia, and astigmatism. Users can wear eyeglasses to help seeing things clearly.

However, eyeglasses having good vision correction functions might fail to function very well in case of deficiency in light. People can see clearly all the ambience and the matters in process with the assistance of sunshine illuminating in daytime or lamp illuminating in night time. As lamp cannot be installed everywhere to provide sufficient illumination, people often fail to see clearly the things around in gloomy room with dim light. In such circumstance, people are especially strenuous in reading or doing documentation work which usually requires much more eyesight.

Accordingly, concerned industry has developed an eyeglass incorporated with lighting apparatus disclosed in U.S. Pat. No. 7,699,486B1 entitled "Illuminated Eyeglass Assembly", the main structure of which is nothing more than a lighting assembly provided on a temple member, and the power source for supplying power to the lighting assembly is essentially one or more mercury cell(s) to supply electricity to the light emitting element for illumination.

The abovementioned US patent has the effect of enhancing illumination, but as the power source for illumination is from the mercury cell(s), it should be replaced when the power becomes insufficient to drive the light emitting element. Since mercury cell not only is a high pollutant to environment but also its recycled rate is bad, so its destruction power to environment is unpredictably high.

In view of the disadvantages found in abovementioned prior art, the inventor of the present invention hereby proposes a novel illuminated eyeglasses based on his proficient experience and knowledge in R&D and manufacturing in relevant field, and according to his endless research.

SUMMARY OF THE INVENTION

The present invention relates to a rechargeable illuminated eyeglasses, the main implementation purpose is to provide a lighting apparatus assembled in a temple arm and capable of charging repeatedly for use in eyeglasses.

In order to achieve above object, the inventor of the present invention proposes a rechargeable illuminated eyeglasses, comprising an eyeglass frame, two temple arms, and a rechargeable lighting apparatus, in which:

two temple arms are respectively hinged on both sides of the eyeglass frame and a rechargeable lighting apparatus is provided in the interior of at least one temple arm, a light emitting body being disposed in front end of the temple arm such that the direction of light beam emitted from the light emitting body is in conformity with user's view direction, wherein the rechargeable lighting apparatus comprises a light emitting body, a control switch, a battery and an USB slot.

Configuring in this way, the battery is recharged with electricity through the USB slot so that undesired battery replacement step becomes unnecessary so as to achieve environment protection purpose of reuse of battery.

Further, the rechargeable lighting apparatus is assembled within an accommodation space of the temple arm, and its light emitting body is disposed in the front end of the temple arm in such a manner that the direction of light beam emitted therefrom is in conformity with user's view direction, a control switch being employed to control ON-OFF of the light emitting body which is supplied with power coming from the battery, the battery being a lithium polymer battery which can be recharged with electricity through the USB slot, a cover plate being provided with respect to the accommodation space of the temple arm so as to store the rechargeable lighting apparatus within the temple arm.

DETAILED DESCRIPTION OF PREFERRED EMBODIMENTS

The objects, the technical contents and the expected effect of the present invention will become more apparent from the detailed description of the preferred embodiment in conjunction with the accompanying drawings.

Figure 1:
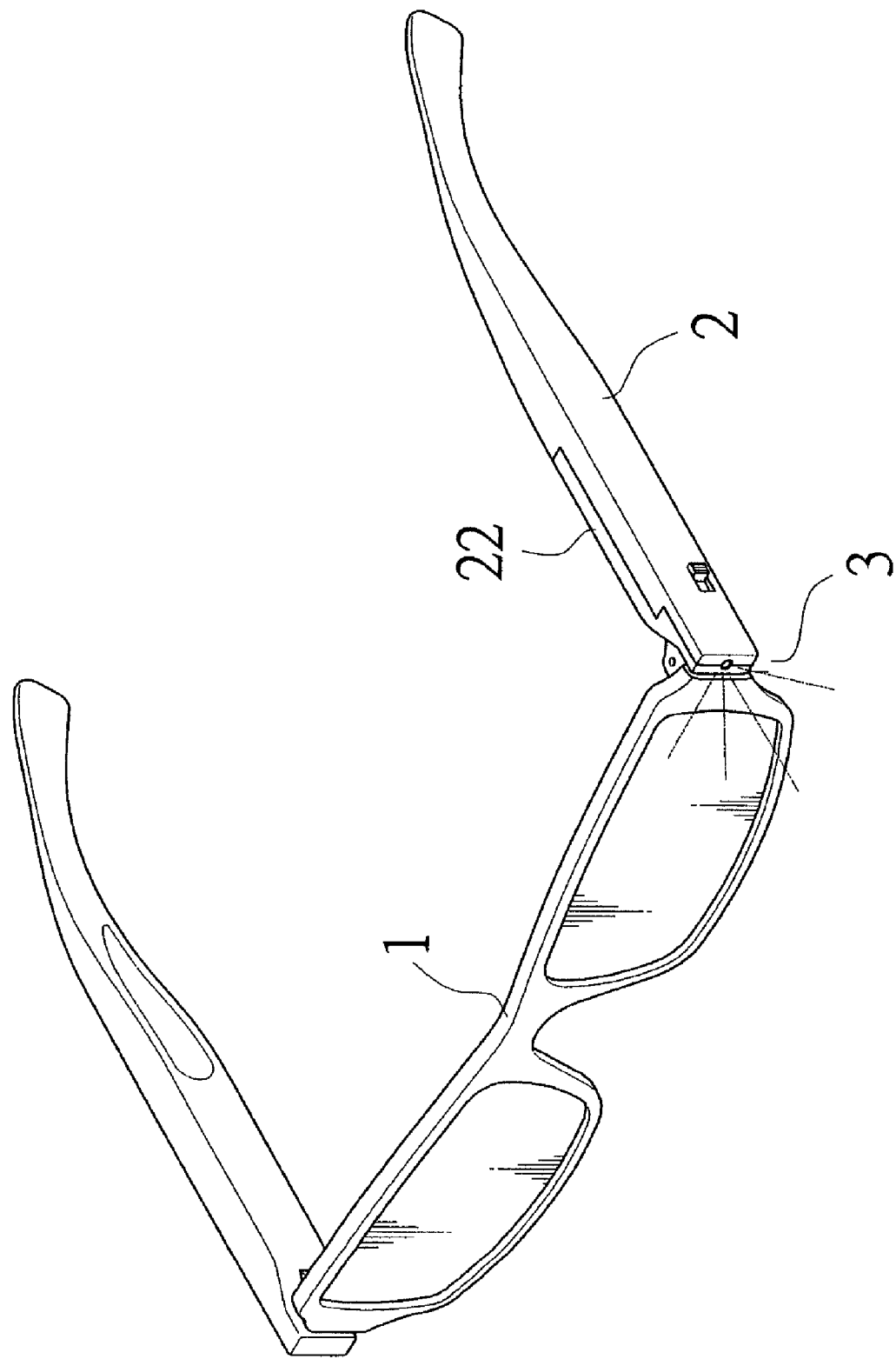
FIG. 1 is a perspective outline schematic view showing the rechargeable illuminated eyeglass of the present invention.
Figure 2:
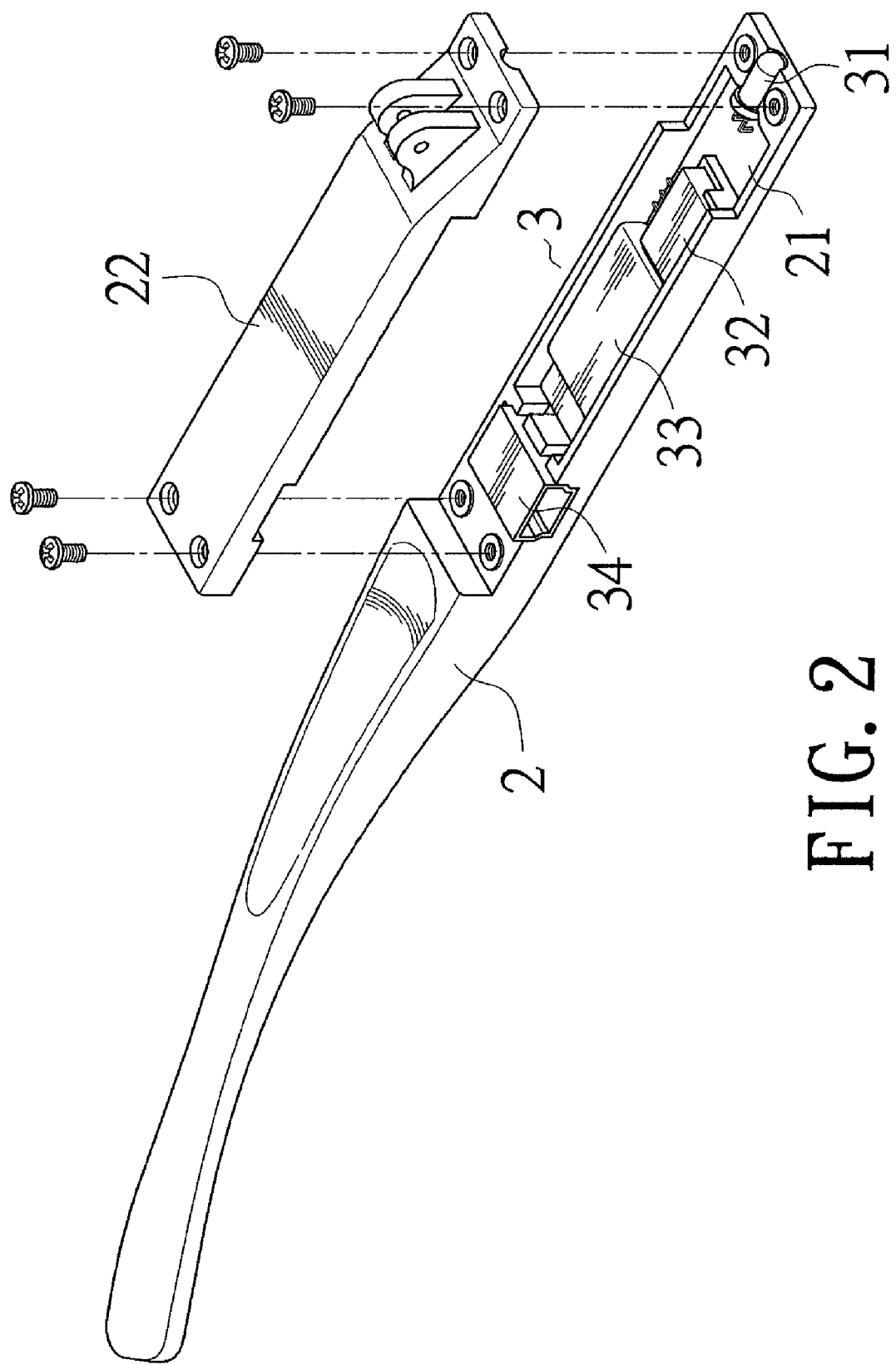
FIG. 2 is a perspective exploded view showing the rechargeable illuminated eyeglass of the present invention.
Figure 3:
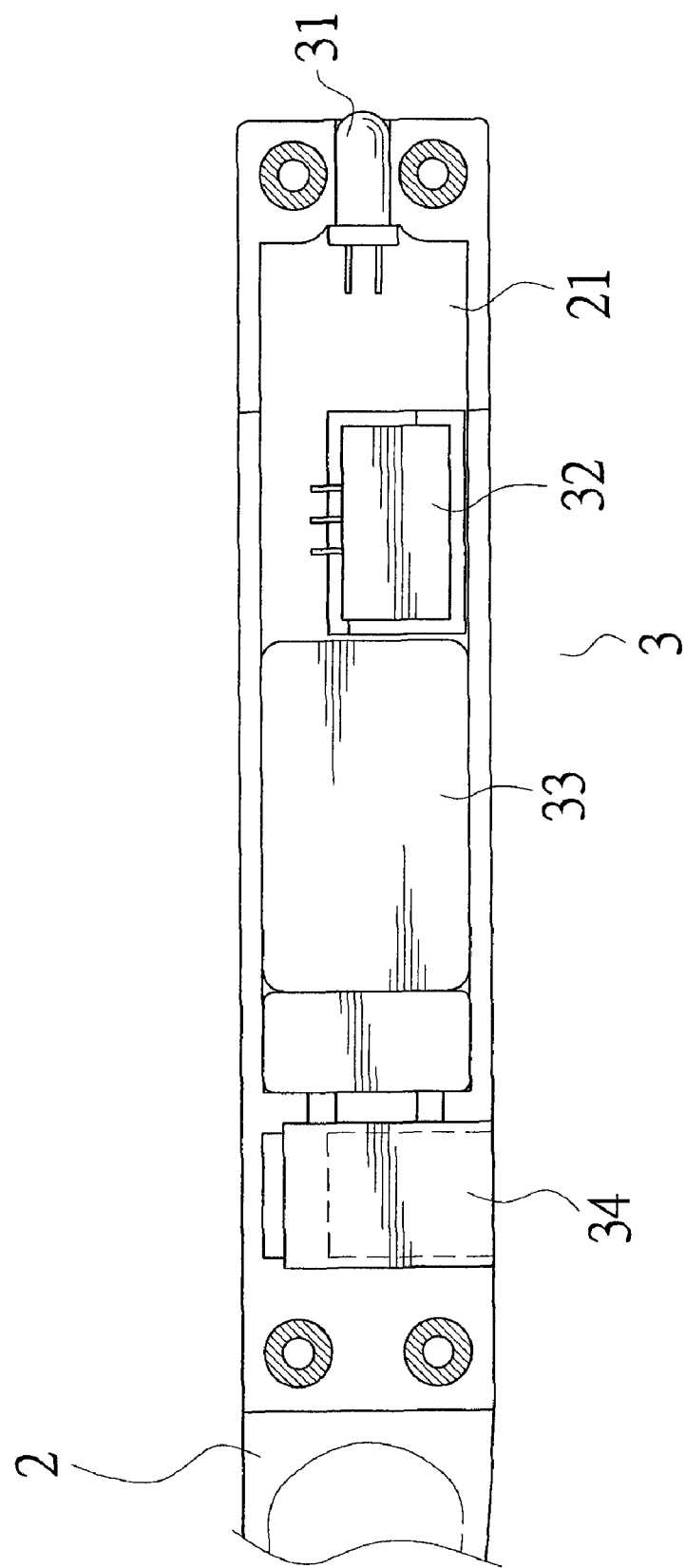
FIG. 3 is a schematic top view showing the rechargeable illuminated eyeglass of the present invention.

Firstly referring to FIGS. 1 to 3 respectively the perspective outline view, the exploded view and the top schematic view of the rechargeable illuminated eyeglasses of the present invention, two temple arms (2) are respectively hinged on both sides of a eyeglass frame (1), and a rechargeable lighting apparatus (3) is provided in the interior of at least one temple arm (2).

An accommodation space (21) for receiving the rechargeable lighting apparatus (3) therein is provided on the temple arm (2), and a cover plate (22) is employed to close the accommodation space (21). The rechargeable lighting apparatus (3) comprises a light emitting body (31) disposed in the front end of the temple arm (2), a control switch (32) employed to control the ON-OFF of the light emitting body (31), a battery (33) for supplying power to the light emitting body (31) and an USB slot (34) connected to the battery (33). In this manner, the battery (33) is recharged with electricity through the USB slot (34) so that undesired battery replacement step can be eliminated so as to achieve environment protection purpose of battery reuse.

In this way, when users want to see clearly things around in dim light room or environment, or when users having either presbyopia or bad eyesight want to read or to conduct documentation work in dim light room, they can wear the rechargeable illuminated eyeglasses of the present invention and turn on the control switch (32) to actuate the light emitting body (31) for illumination enhancement. The light emitted body (31) is supplied with power from the battery (33) continuously so as to achieve best illumination. The direction of light beam emitted from the light emitting body (31) is in conformity with user's view direction such that user can change view direction as desired without changing the illumination effect. In this manner, the rechargeable illuminated eyeglasses of the present invention can fully display the benefit of helping the people to see clearly all things around and to conduct documentation work.

When the power of the battery (33) is exhausted, the battery (33) can be recharged with electricity through the USB slot (34). As to the USB slot (34) charging mode nowadays, either computer facility can be employed for the USB slot (34) charging mode or utility power can be employed through a converter for the USB slot (34) charging mode. In addition, the rechargeable lighting apparatus(es) (3) of the present invention can be either provided in one temple arm (2) or in both temple arms (2) so as to achieve better assistance effect for illumination.

It is apparent from the above structure and implementation, the present invention has the advantages set forth below.

1. In the rechargeable illuminated eyeglasses of the present invention, a rechargeable lighting apparatus is provided on a temple arm so as to achieve illumination effect with the assistance came from the light beam emitted from a light emitting body. Also, the light emitting body is disposed in the front end of the temple arm in such a manner that the direction of the light beam emitted is in conformity with user's view direction. When user changes view direction as desired, the illumination effect is not affected. In this manner, the rechargeable illuminated eyeglasses of the present invention can fully display the benefit of helping the people to see clearly all things around and to conduct documentation work.

2. In the rechargeable illuminated eyeglasses of the present invention, the battery is recharged with electricity through the USB slot so that undesired battery replacement step can be eliminated to achieve environment protection purpose of reuse of battery.

Summing up above, the present invention can achieve expected effect, and the specific structure disclosed herein is unprecedented in the same category of product, even has not been opened to the public before application.

What is claimed is:

1. A rechargeable illuminated eyeglasses, comprising:
   two temple arms each having an interior end portion longitudinally offset from a terminal end portion, the interior end portions of the temple arms being respectively hinged on both sides of an eyeglass frame; and
   a rechargeable lighting apparatus contained within an accommodation space provided at the interior end portion of at least one temple arm to be displaceable therewith relative to the eyeglass frame,
      wherein said rechargeable lighting apparatus includes: a light emitting body disposed in the front end of said temple arm interior end portion, a control switch for controlling ON-OFF of the light emitting body, a rechargeable battery for supplying power to the light emitting body, and USB slot connected to the battery;
      the light emitting body, control switch, rechargeable battery, and USB port being co-located within said accommodation space.

2. The rechargeable illuminated eyeglasses as claimed in claim 1, wherein an accommodation space is provided on said temple arm for storing the rechargeable lighting apparatus therein, and a cover plate is employed to close the accommodation space.

3. The rechargeable illuminated eyeglass as claimed in claim 1, wherein said battery is a lithium polymer battery.

* * * * *